(12) United States Patent
Gustafson et al.

(10) Patent No.: US 7,643,910 B1
(45) Date of Patent: Jan. 5, 2010

(54) SPRAY CHAMBER VALVE CONTROL SYSTEM

(75) Inventors: William C. Gustafson, Moscow, ID (US); Bruce Smetana, Colton, WA (US); Jeffery Weiler, Liberty Lake, WA (US)

(73) Assignee: Isothermal Systems Research, Inc., Liberty Lake, WA (US)

( * ) Notice: Subject to any disclaimer, the term of this patent is extended or adjusted under 35 U.S.C. 154(b) by 1182 days.

(21) Appl. No.: 10/622,181

(22) Filed: Jul. 16, 2003

(51) Int. Cl.
*A01G 27/00* (2006.01)
*G05D 7/00* (2006.01)

(52) U.S. Cl. .................... 700/283; 700/282; 239/69

(58) Field of Classification Search .......... 700/281–283; 239/67–70, 159, 349, 353; 73/861; 222/14; 427/8, 421.1; 118/300
See application file for complete search history.

(56) References Cited

U.S. PATENT DOCUMENTS

| | | | | |
|---|---|---|---|---|
| 4,073,315 A | * | 2/1978 | McClocklin et al. | 137/629 |
| 5,487,313 A | * | 1/1996 | Johnson | 73/863.71 |
| 5,505,335 A | * | 4/1996 | Uemura et al. | 73/861 |
| 6,016,711 A | * | 1/2000 | Ullman et al. | 73/863.03 |
| 6,811,806 B2 | * | 11/2004 | Droski | 118/300 |
| 2003/0132310 A1 | * | 7/2003 | Polk et al. | 239/159 |

* cited by examiner

*Primary Examiner*—Charles R Kasenge
(74) *Attorney, Agent, or Firm*—Michael S. Neustel

(57) ABSTRACT

A spray chamber valve control system for ensuring that coolant is sufficiently available at the intakes of pumps in a spray cooled environment regardless of the attitude, acceleration or deceleration of a spray chassis. The spray chamber valve control system includes a spray chassis with an interior portion for spray cooling electronic devices, a plurality of valves positioned within the inner corners of the spray chassis, and a control unit in communication with the valves for controlling the operation thereof. The control unit ensures that at least one valve is open at all times. The control unit also provides a recovery routine for when only one valve is open during a valve state change.

10 Claims, 12 Drawing Sheets

One Valve Open Recovery Routine (OVORR)

Routine Valve Scheduler (RSV)

SPRAY CHAMBER VALVE CONTROL SYSTEM

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N6835-D-0451 URO1 awarded by the United States Navy.

CROSS REFERENCE TO RELATED APPLICATIONS

Not applicable to this application.

BACKGROUND OF THE INVENTION

1. Field of the Invention

The present invention relates generally to liquid thermal management systems for thermally managing electronic devices and more specifically it relates to a spray chamber valve control system for ensuring that coolant is sufficiently available at the intakes of pumps in a spray cooled environment regardless of the attitude, acceleration or deceleration of a spray chamber.

2. Description of the Related Art

Thermal management systems for electronic systems utilized in various environments have been in use for years. In order to maintain maximum performance from electronic components, the components need to be maintained within a relatively narrow temperature band. Thermal management systems are utilized to maintain this desired narrow temperature band.

In addition, some external environments include hostile elements such as but not limited to dust, sand, debris, salt, water, fog, condensed water vapor, contaminants and the like, which require the complete isolation of electronic components from the harsh external environment. Extreme external environments are encountered within various applications such as aircraft, ships, ground based applications and the like. It is absolutely crucial that electronic components be maintained in a safe internally controlled environment when in extreme external environments.

Conventional thermal management systems commonly utilized today are comprised of air-cooled enclosures (forced flow or free flow), conduction cooling and liquid immersion cooling. The main problem with air-cooled enclosures is that they introduce harmful external elements into the electronics enclosure. Another problem with air-cooled enclosures is that they do not provide a method to increase the temperature of electronic components to a desired operating temperature when the external temperature is extremely low (e.g. −65° C.). Problems with conduction cooling systems include increased weight, increased size, increased mass, expensive, reduced shock and vibration tolerance, and reduced electronic component performance. A significant design limitation with conduction cooling systems is that they must be in direct contact with the electronic components which limits flexibility and increases expense. The large mass also increases the amount of time required to increase the temperature of electronic components to a desired operating temperature.

Spray cooling technologies are being adopted today as the most efficient option for thermally managing electronic systems in an enclosed internal environment. Spray cooling preferably utilizes an atomized dielectric spray that is applied directly to the electronic devices within a sealed spray chassis thereby forming a thin film on the electronic devices. Spray cooling may be performed locally (i.e. where the chip is sprayed directly) or globally (i.e. where the chip and surrounding electronics/boards are also sprayed).

U.S. Pat. No. 5,220,804 entitled High Heat Flux Evaporative Spray Cooling to Tilton et al. describes an early chip spray cool system that achieves high heat flux cooling by optimizing droplet momentum, momentum of the thin coolant film, and by managing vapor and excess fluid in the system. U.S. Pat. No. 6,108,201 entitled Fluid Control Apparatus and Method for Spray Cooling to Tilton et al. describes the usage of global spray cooling technology to cool a printed circuit board.

While these devices may be suitable for the particular purpose to which they address, they are not as suitable for ensuring that coolant is sufficiently available at the intakes of pumps in a global spray cooled environment regardless of the attitude, acceleration or deceleration of a spray chamber. Conventional spray cooling applications do not provide adequate assurance of ample liquid coolant to the intake of the pumps.

In these respects, the spray chamber valve control system according to the present invention substantially departs from the conventional concepts and designs of the prior art, and in so doing provides an apparatus primarily developed for the purpose of ensuring that coolant is sufficiently available at the intakes of pumps in a spray cooled environment regardless of the attitude, deceleration and/or acceleration of a spray chamber.

BRIEF SUMMARY OF THE INVENTION

In view of the foregoing disadvantages inherent in the known types of spray cooling systems now present in the prior art, the present invention provides a new spray chamber valve control system construction wherein the same can be utilized for ensuring that coolant is sufficiently available at the intakes of pumps in a spray cooled environment regardless of the attitude, acceleration and deceleration of a spray chassis.

The general purpose of the present invention, which will be described subsequently in greater detail, is to provide a spray chamber valve control system that has many of the advantages of the spray cooling systems mentioned heretofore and many novel features that result in a new spray chamber valve control system which is not anticipated, rendered obvious, suggested, or even implied by any of the prior art spray cooling systems, either alone or in any combination thereof.

To attain this, the present invention generally comprises a spray chamber with an interior portion for spray cooling electronic devices, a plurality of valves positioned within the inner corners of the spray chassis, and a control unit in communication with the valves for controlling the operation thereof. The control unit ensures that at least one valve is open at all times. The control unit also provides a recovery routine for when only one valve is open during a state change.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a spray chamber valve control system that will overcome the shortcomings of the prior art devices.

A second object is to provide a spray chamber valve control system for ensuring that coolant is sufficiently available at the intakes of pumps in a spray cooled environment regardless of the attitude of a spray chassis.

Another object is to provide a spray chamber valve control system that ensures that at least one valve is open at all times.

An additional object is to provide a spray chamber valve control system that energizes each valve periodically to ensure the valves are in the proper state in high vibration and shock environments.

A further object is to provide a spray chamber valve control system that is capable of handling a one valve open condition when a second valve needs to be opened to reduce the pressure drop across the second valve.

Another object is to provide a spray chamber valve control system that does not require direct feedback from the valves regarding their respective status.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 8b is a flowchart continuing from FIG. 8a.

DETAILED DESCRIPTION OF THE INVENTION

A. Overview

Figure 1:
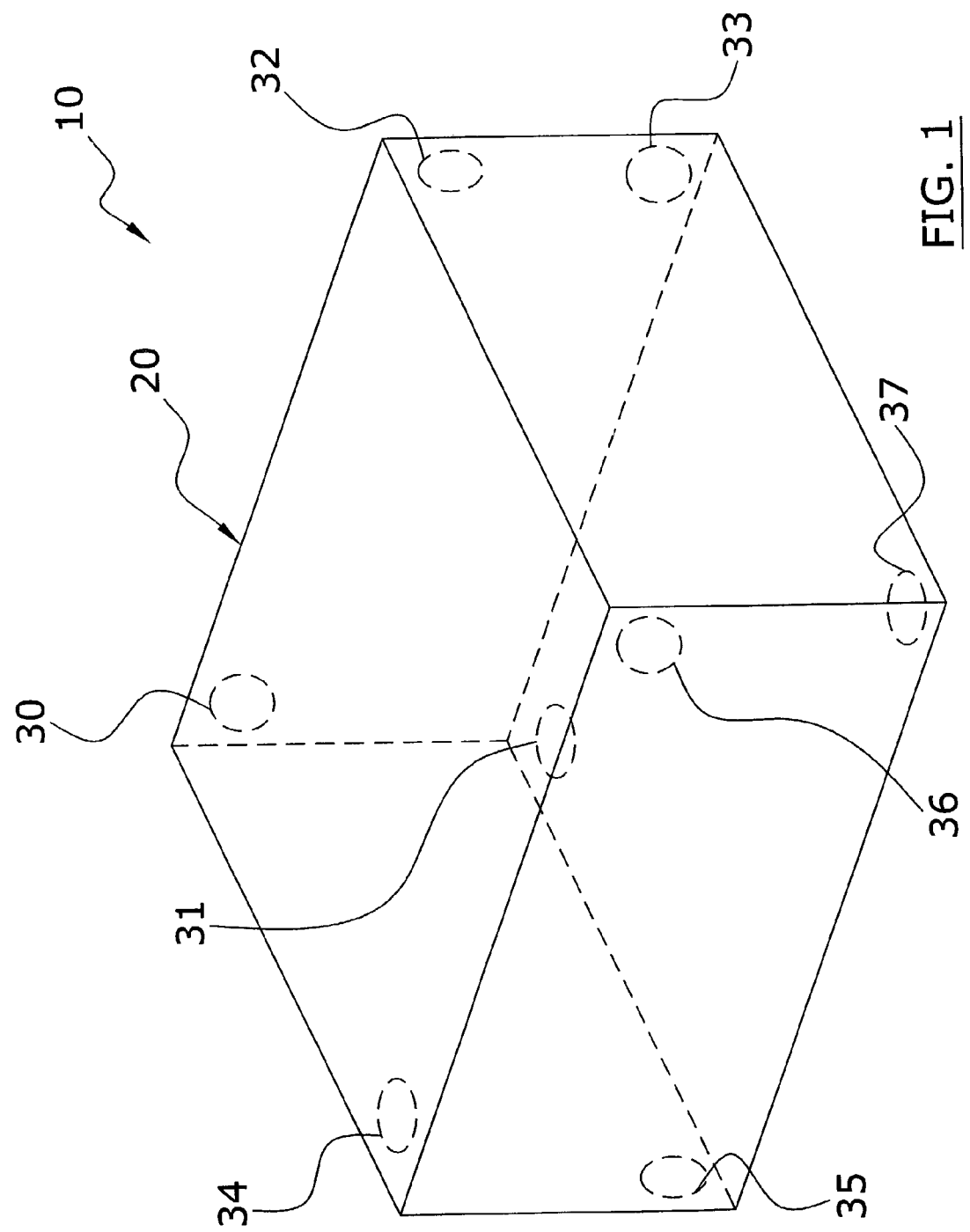
FIG. 1 is an upper perspective view of an exemplary spray chamber with the valves located within the inner corners thereof.

Turning now descriptively to the drawings, in which similar reference characters denote similar elements throughout the several views, FIGS. 1 through 9c illustrate a spray chamber valve control system 10, which comprises a spray chamber 20 with an interior portion for spray cooling electronic devices, a plurality of valves 30-37 positioned within the inner corners of the spray chamber 20, and a control unit 40 in communication with the valves 30-37 for controlling the operation thereof. The control unit 40 ensures that at least one valve is open at all times. The control unit 40 also provides a recovery routine for when only one valve 30-37 is open during a state change.

B. Spray Chamber

The spray chamber 20 has a sealed interior portion wherein one or more electronic devices are thermally managed with a liquid coolant. FIG. 1 illustrates an exemplary spray chamber 20 having an interior portion comprised of a rectangular structure having eight interior corner portions. However, it can be appreciated that the spray chamber 20 may have various other exterior and interior shapes/structures capable of retaining one or more electronic devices. The present invention may be utilized with respect to various spray chambers 20 commonly utilized in the spray cooling industry.

One common configuration for a spray chamber 20 is formed by a single isolated housing that completely encloses the spray cool system, wherein the spray cool system comprises at least one component to be cooled, a cooling fluid, at least one sprayer, a pump and a heat exchanger. The heat exchanger may be created by convective cooling of the housing structure.

Another common configuration for the spray chamber 20 configuration encloses one or more components and/or cards to be cooled, a portion of the cooling fluid and at least one liquid sprayer. This type of a spray chamber 20 is in fluid connection with a remote heat exchanger system, a remote pump system, or both.

Within the spray chamber 20 various structures may be contained within that retain and support the electronic devices to be thermally managed. The spray chamber 20 may also include various door structures for providing access to the interior portion thereof.

The spray chamber 20 has one or more spray units that dispense a spray of liquid coolant upon the electronic devices within the interior portion of the spray chamber 20 to thermally manage the electronic devices. The liquid coolant may be comprised of a dielectric or non-dielectric. The present invention may be utilized with respect to various spray units commonly utilized in the spray cooling industry.

Figure 3:
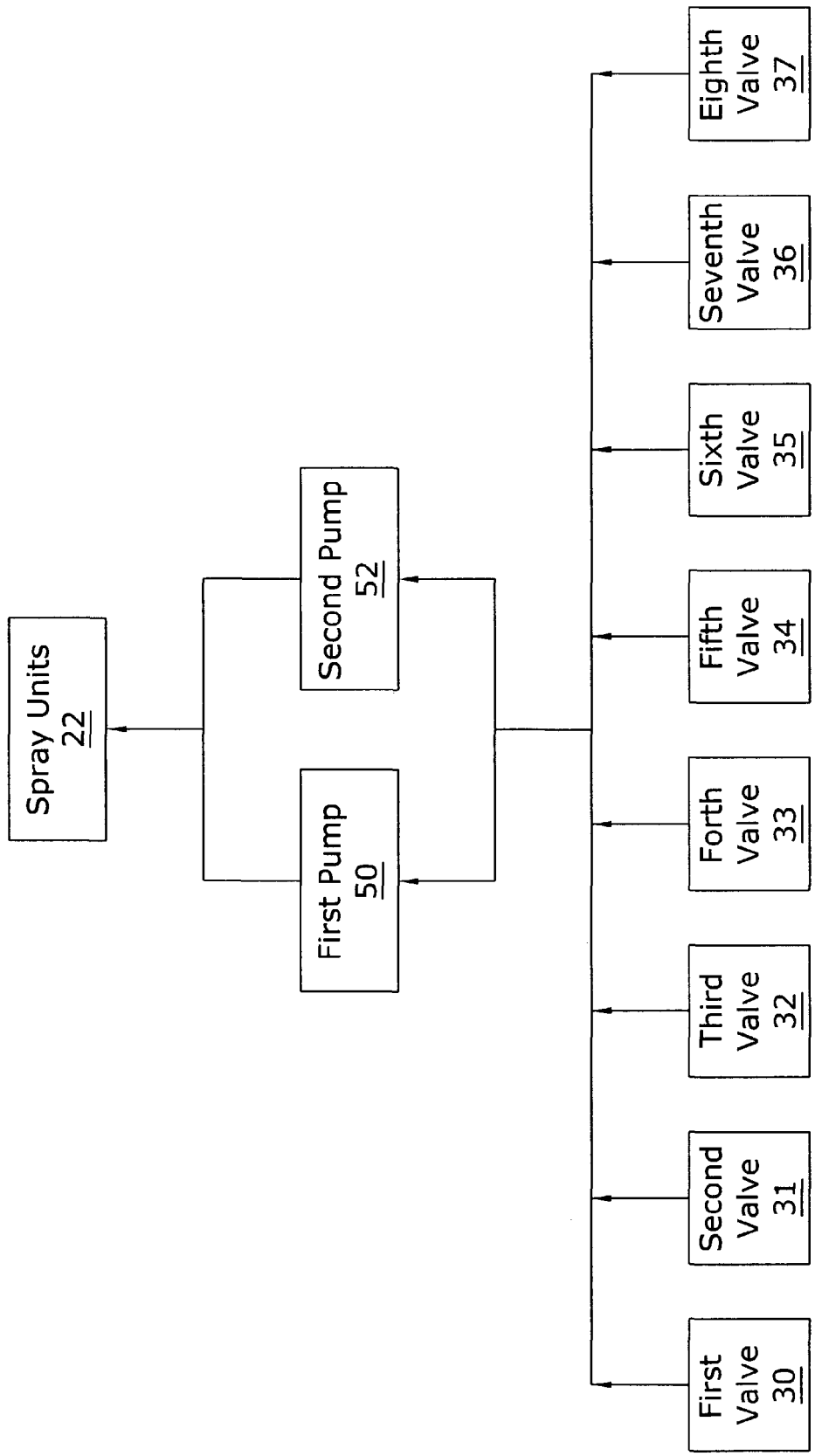
FIG. 3 is a block diagram illustrating the coolant flow through the present invention.

The spray units are fluidly connected to one or more pumps 50, 52 that provide pressurized liquid coolant to the spray units as shown in FIG. 3 of the drawings. The pumps 50, 52 may be comprised of various well-known pump devices. In addition, there may be one or more pumps 50, 52 utilized within the present invention.

C. Valves

The valves 30-37 utilized within the present invention are fluidly connected to the intake of the pumps 50, 52 as shown in FIG. 3 of the drawings. The valves 30-37 are preferably positioned within the interior portion of the spray chamber 20 so as to collect coolant regardless of the position of the spray chamber 20. FIG. 3 illustrates the fluid connection of the valves 30-37 to the pumps 50, 52.

The valves 30-37 are preferably positioned within all interior corners of the spray chamber 20 as illustrated in FIG. 1 of the drawings. More particularly, the valves 30-37 preferably are positioned so that their respective intakes are positioned adjacent to or near one of the interior surfaces of the spray chamber 20 as shown in FIG. 1 of the drawings. Each interior surface within the spray chamber 20 preferably has at least one of the valves 30-37 positioned adjacent to it so as to ensure proper fluid recovery regardless of the attitude, acceleration or deceleration of the spray chamber 20. However, the valves 30-37 may be located in various other locations within the interior portion of the spray chamber 20 to provide sufficient collection of the liquid coolant sprayed upon the electronic devices within the spray chamber 20 (e.g. within the corners, etc.).

The valves 30-37 are preferably magnetically latched both in their open position and closed position. An actuator 62 within each of the valves 30-37 is in communication with the control unit 40 for applying an opening or closing force upon a single valve 30-37. The magnetically latched valve structure reduces the amount of power required to operate the present invention since the actuator 62 needs to only be powered briefly to open or close the valve. The valves 30-37 may also communicate their open/closed state to the control unit 40. It can be appreciated that non-magnetically latching valves 30-37 may also be utilized within the present invention.

Figure 4:
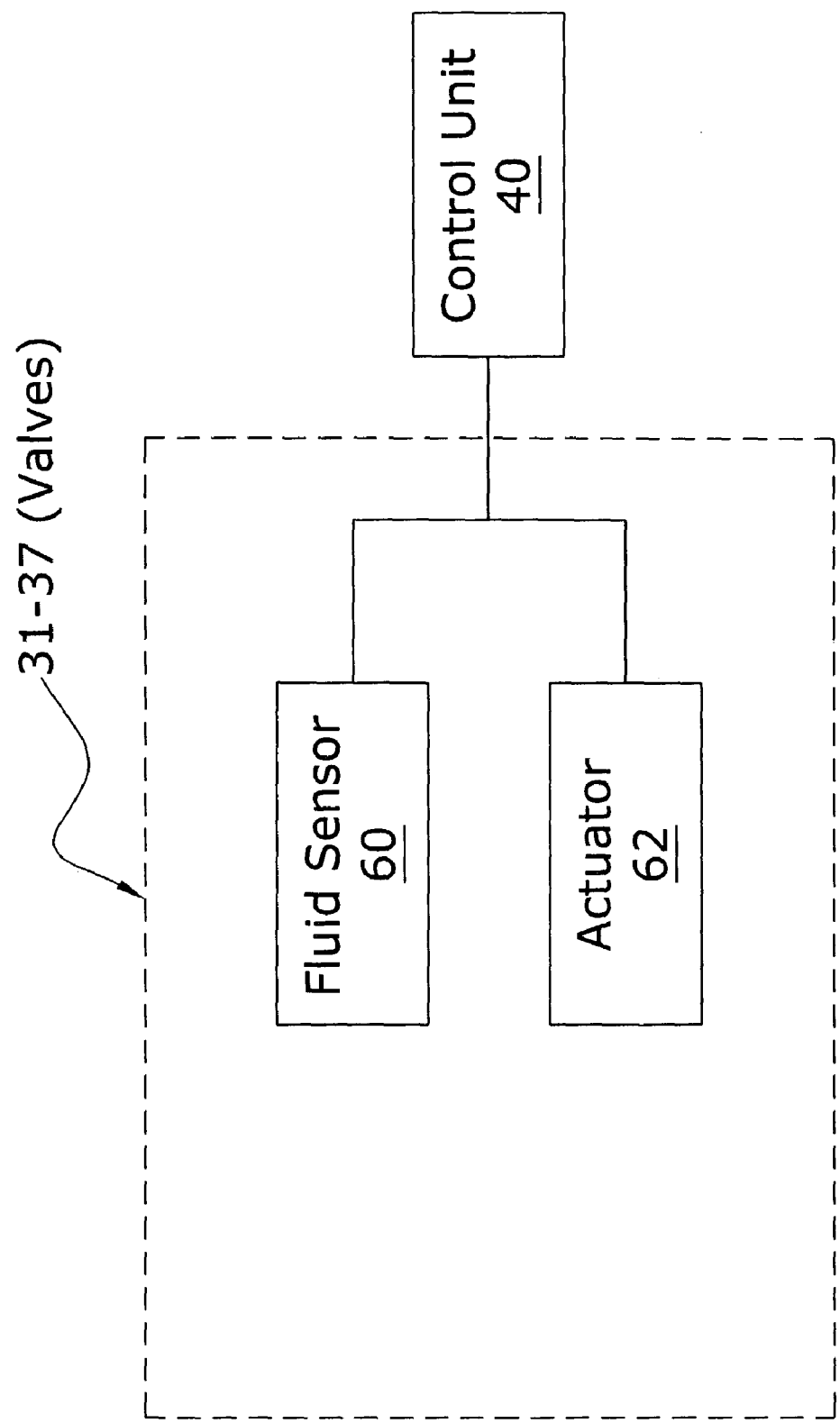
FIG. 4 is a block diagram of a valve illustrating the fluid sensor and actuator in communication with the control unit.

The valves 30-37 also preferably each have a fluid sensor positioned within them as shown in FIG. 4 of the drawings. The fluid sensor determines if liquid coolant is present about the individual valve that is then communicated to the control unit 40. The control unit 40 then determines what action, if any, should be taken with respect to the open/closed state of the valve.

D. Control Unit

Figure 2:
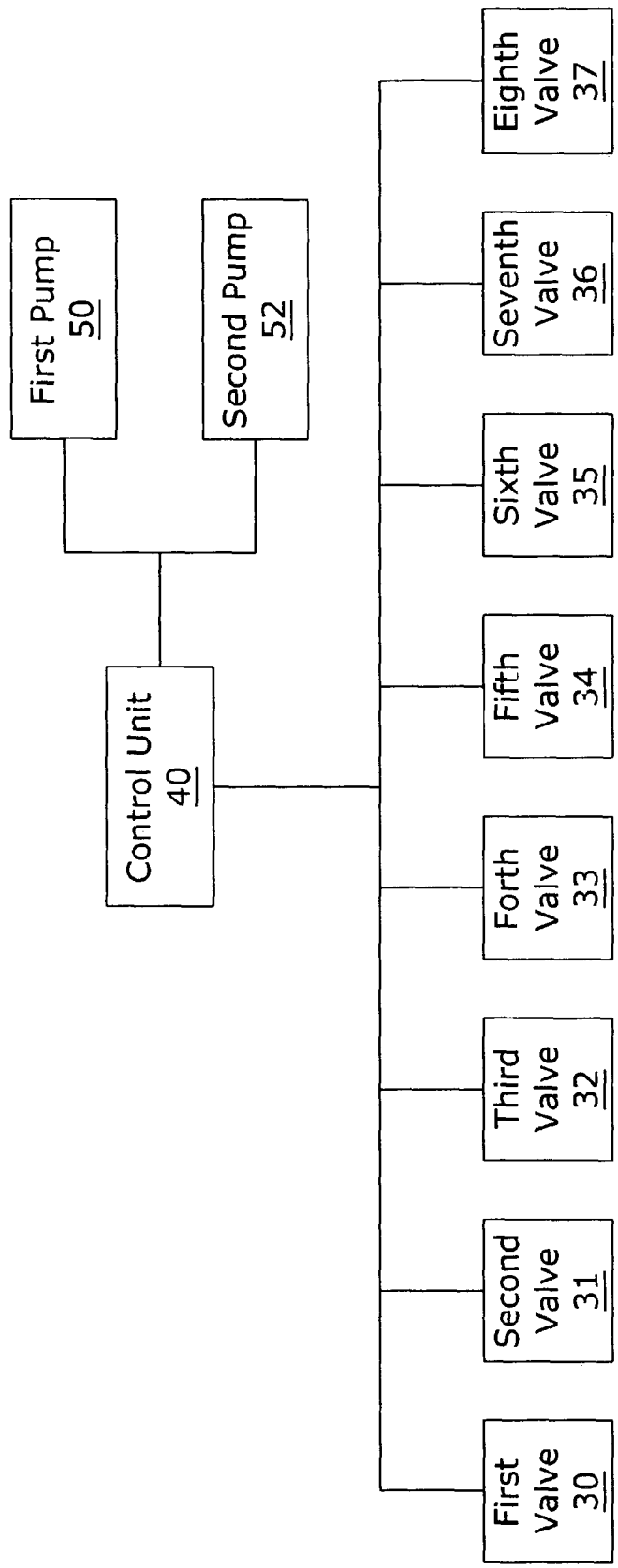
FIG. 2 is a block diagram illustrating the communications of the valves, pumps and control unit.

The control unit 40 may be comprised of various electronic devices capable of communicating with and controlling the valves 30-37, a thermal conditioning unit, and the pumps 50, 52 as shown in FIG. 2 of the drawings. The control unit 40 may also be in communication with the electronic devices being thermally managed within the spray chamber 20. The control unit 40 may be comprised of a computer or other electronic device capable of receiving and storing commands. It can be appreciated that more than one control unit 40 may be utilized to control one or more of the components of the present invention.

The control unit 40 is preferably programmable and capable of storing various types of data. The control unit 40 is further capable of determining the open/closed state of each of the valves 30-37 based upon prior actions taken to open or close each of the valves 30-37.

E. General Operation i. Initial Operation

Figure 5:
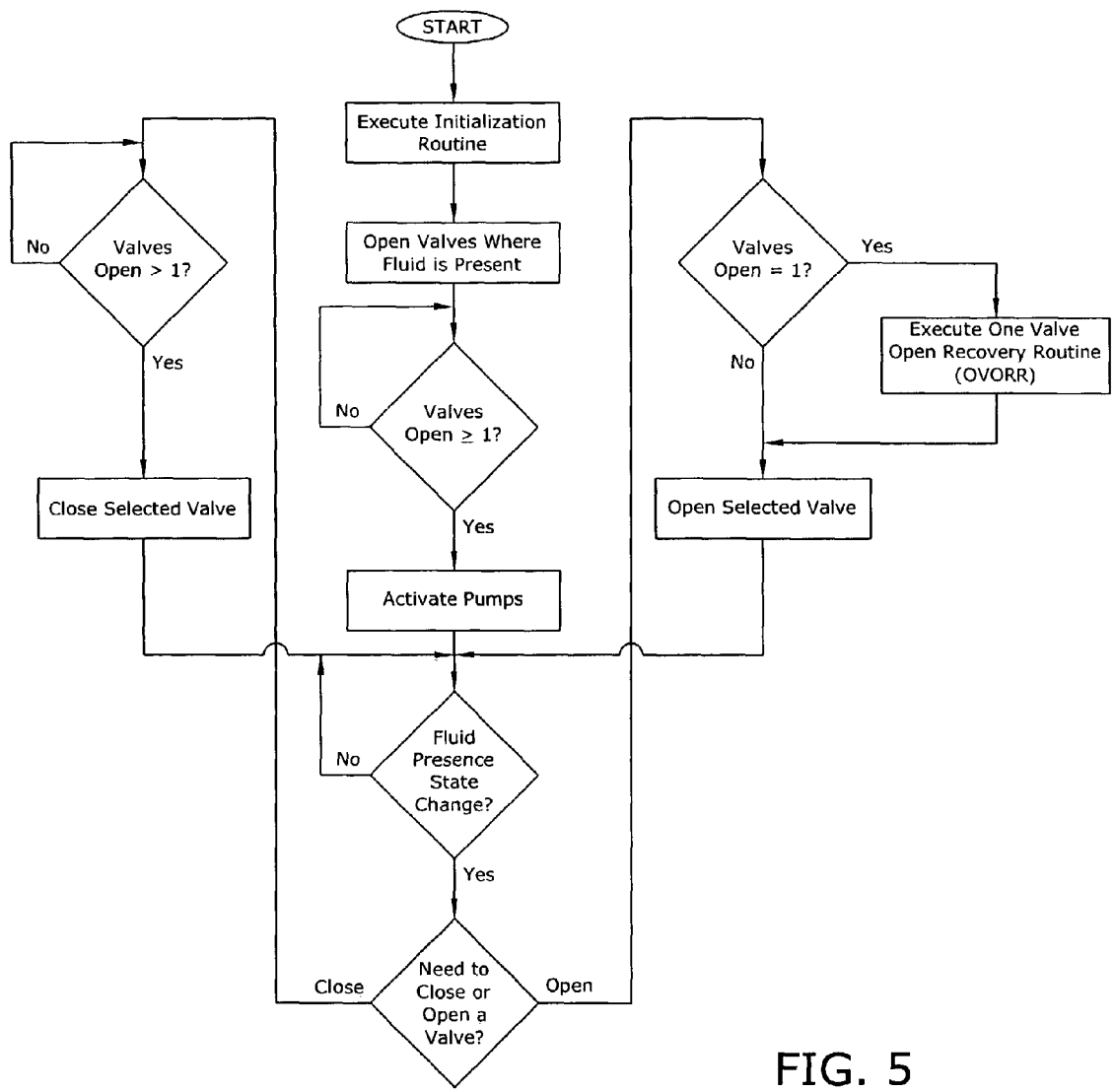
FIG. 5 is a flowchart illustrating the overall operation of the present invention.

FIG. 5 illustrates the overall functionality of the present invention. During the startup of the present invention, an initialization routine is entered into where all of the valves 30-37 are initially closed and the overall system tested. The control unit 40 thereafter opens the valves 30-37 that have fluid present as detected by their respective fluid sensor.

If one or more valves are in the open state, the control unit 40 thereafter activates the pumps 50, 52 as shown in FIG. 5 of the drawings. If no valves are in the open state, the control unit 40 does not activate the pumps 50, 52.

The control routine demonstrated in FIGS. 8a-9c is entered into and executed periodically (e.g. approximately every 50 milliseconds, etc.). The purpose of the control routine is to select between three possible actions.

1. OPEN. Select and energize a single valve to the open state.
2. CLOSE. Select and energize a single valve to the closed state.
3. NOTHING. No action is taken (Not all passes through the control routine require any action.).

During the next execution of the control routine for the next valve 30-37, any valve 30-37 that was energized in the prior execution of the control routine is turned off thereby ensuring that only one valve 30-37 is energized at any moment in time.

ii. Fluid Presence State Change

If one of the valves 30-37 experiences a fluid presence state change (i.e. present to not present, or not present to present), the control unit 40 then must open or close the respective valves 30-37. The fluid presence state change is communicated to the control unit 40 by either the fluid sensor within the appropriate valve, or sensors external of the valves 30-37.

iii. Fluid not Present State Change

FIG. 5 illustrates that if one of the valves 30-37 needs to be closed due to lack of coolant that the control unit 40 determines if more than one of the valves 30-37 is currently open. If there is more than one valve open, the control unit 40 then closes the designated valve where liquid coolant is not present.

If there is only one valve in the open state, the control unit 40 will not close the designated valve as further shown in FIG. 5 of the drawings. The control unit 40 waits until at least two valves are open prior to closing the designated valve.

iv. Fluid Present State Change

FIG. 5 further illustrates that if one of the valves 30-37 needs to be opened due to the presence of coolant that the control unit 40 determines if only one valve is currently open. If only one valve is open, the pressure drop across the valve to be opened may be so great during peak coolant demand that the respective actuator may not be able to apply a force sufficient to open the designated valve.

If more than one valve is open, the control unit 40 simply opens the designated valve and continues operation as shown in FIG. 5 of the drawings. However, if there is only one valve open, the control unit 40 enters an open valve open recovery routine (OVORR) as shown in FIGS. 5 and 6 of the drawings.

F. One Valve Open Recovery Routine (OVORR)

Figure 6:
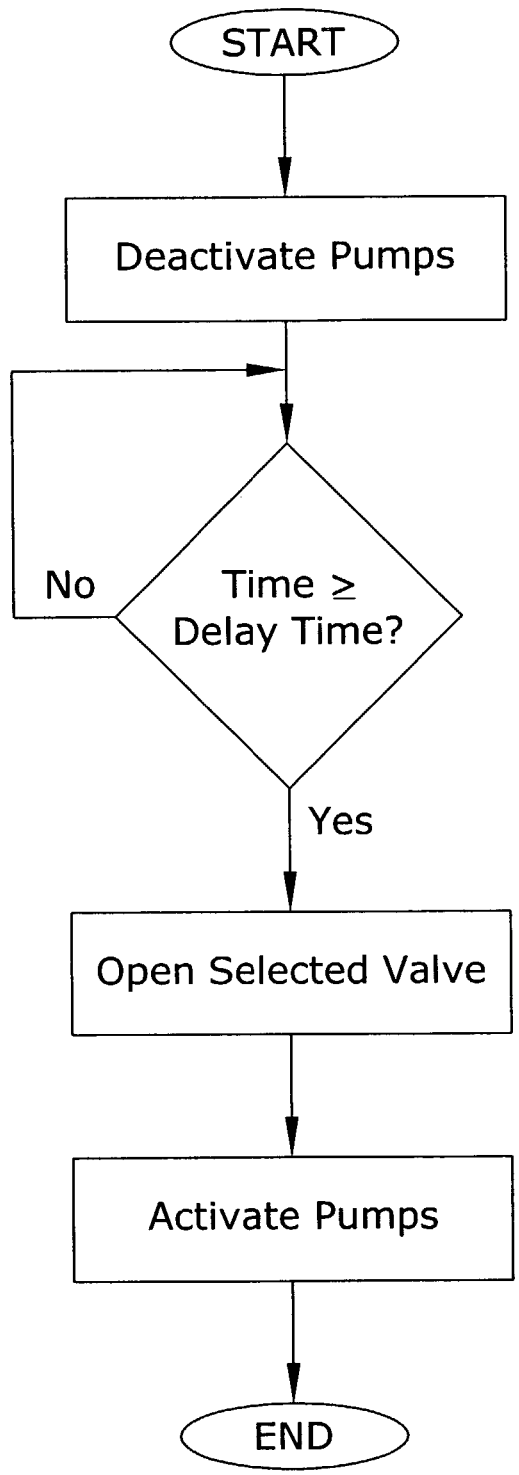
FIG. 6 is a flowchart illustrating the one valve open recovery routine (OVORR).
Figure 9A:
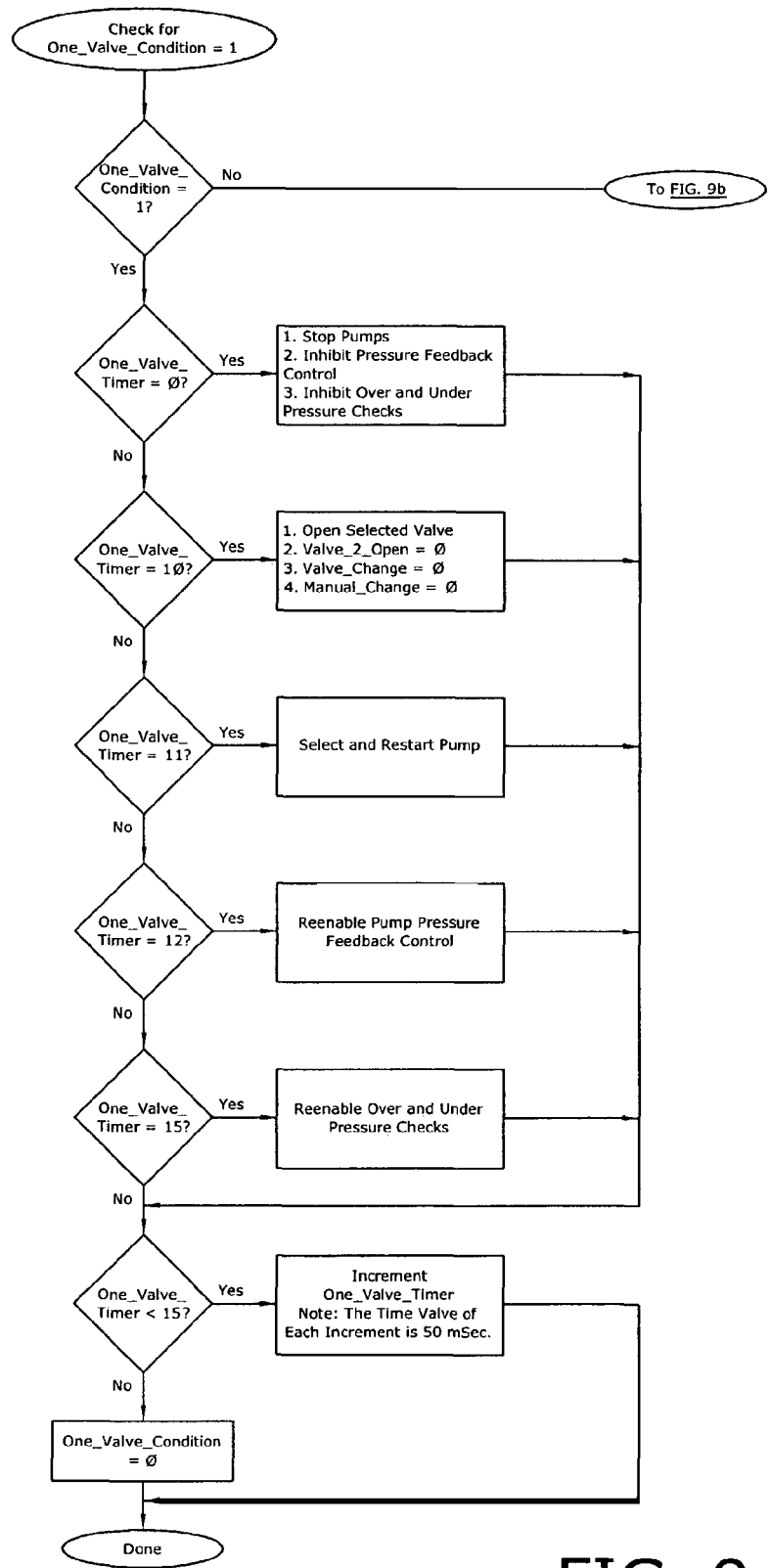
FIG. 9a is a flowchart illustrating an exemplary detailed operation of the OVORR.

FIGS. 6 and 9a illustrate the open valve open recovery routine (OVORR) when only one valve is open and the control unit 40 needs to open a second valve. In the OVORR, the control unit 40 deactivates the pumps 50, 52 for a sufficient period of time (Delay Time) to allow the intake pressure drop across the valves 30-37 to be reduced to a level that will permit reliable operation of the valves 30-37.

The Delay Time is preferably approximately ½ second, however greater or less periods of time may also be utilized to ensure that the designated valve may be opened properly. Preferably, the delay time is between 0.25 seconds to 0.75 seconds.

It is important to note that the OVORR consumes 15 passes through the valve control routine. During this recovery time, no other valve operation is preferably allowed. After the OVORR is completed, the pumps 50, 52 are turned on and normal operation is resumed.

After the appropriate Delay Time has passed, the control unit 40 thereafter opens the designated valve. After the designated valve has been opened, the control unit 40 thereafter activates the pumps 50, 52 again for normal operation.

G. Routine Valve Scheduler (RVS)

Figure 7:
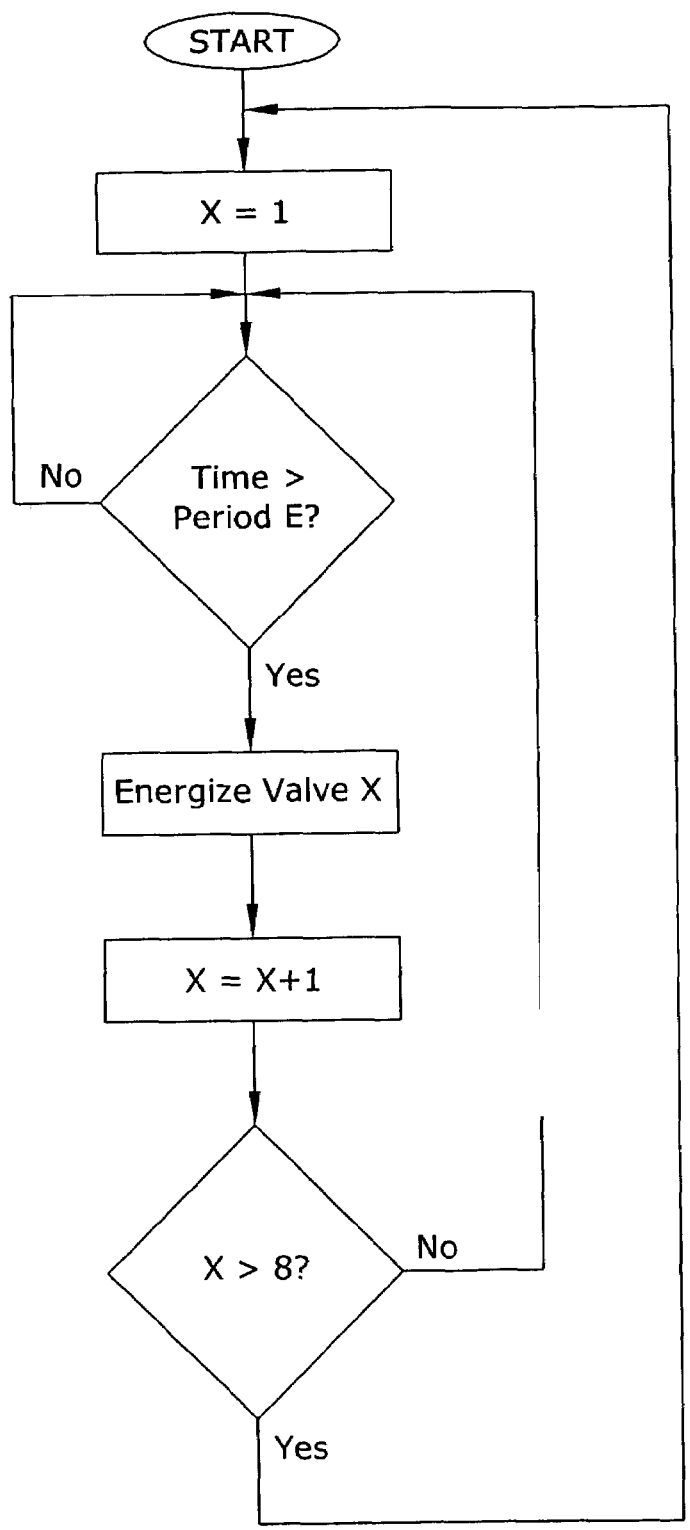
FIG. 7 is a flowchart illustrating the routine valve scheduler (RVS).
Figure 8A:
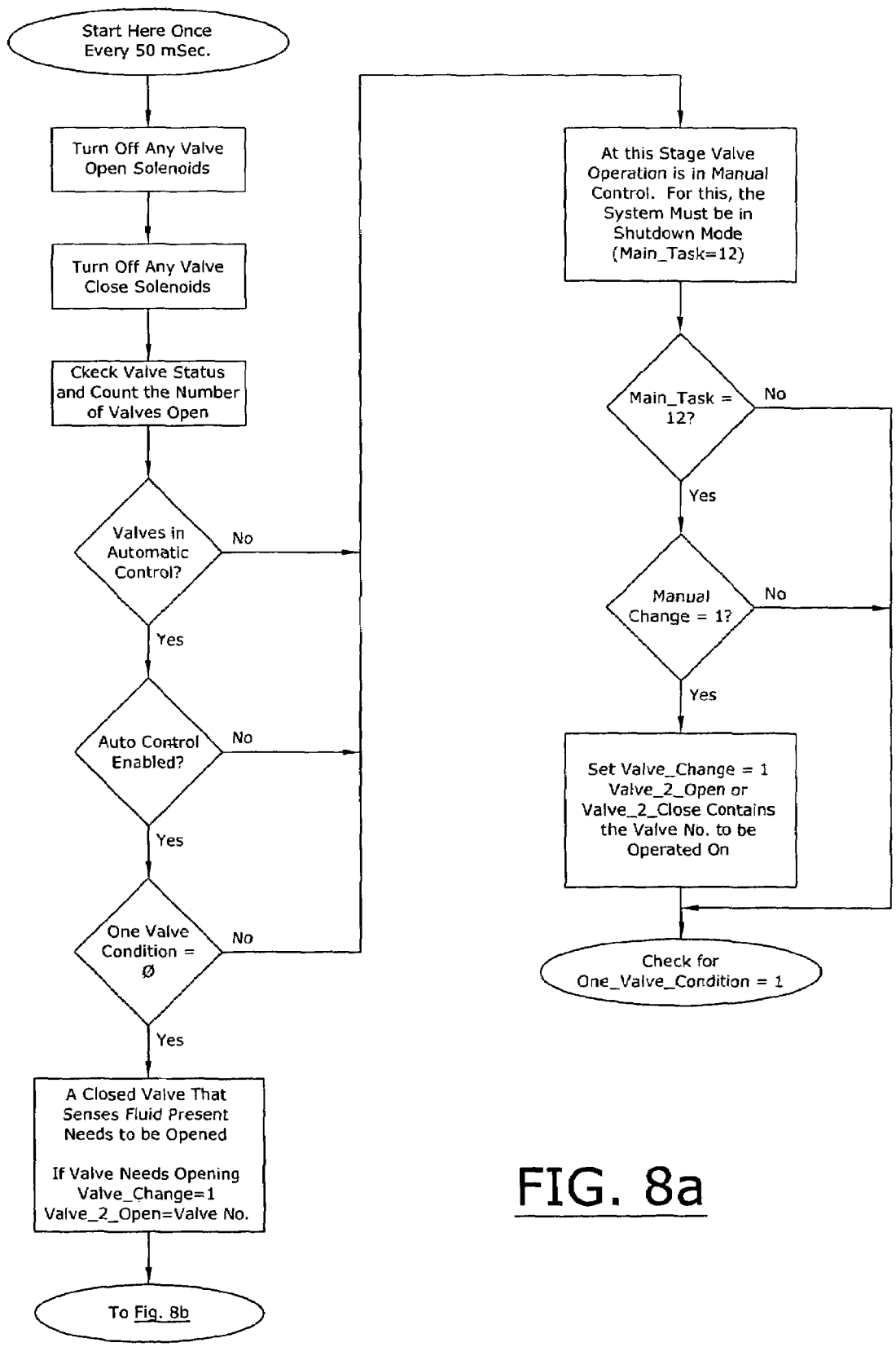
FIG. 8a is a flowchart illustrating an exemplary detailed operation of the present invention.
Figure 8B:
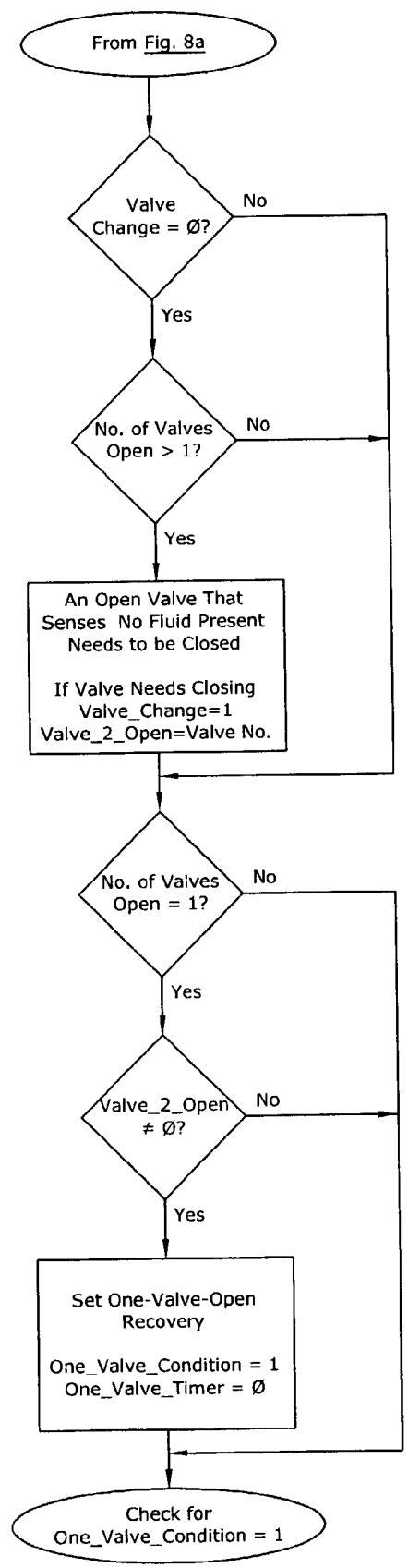
Figure 9B:
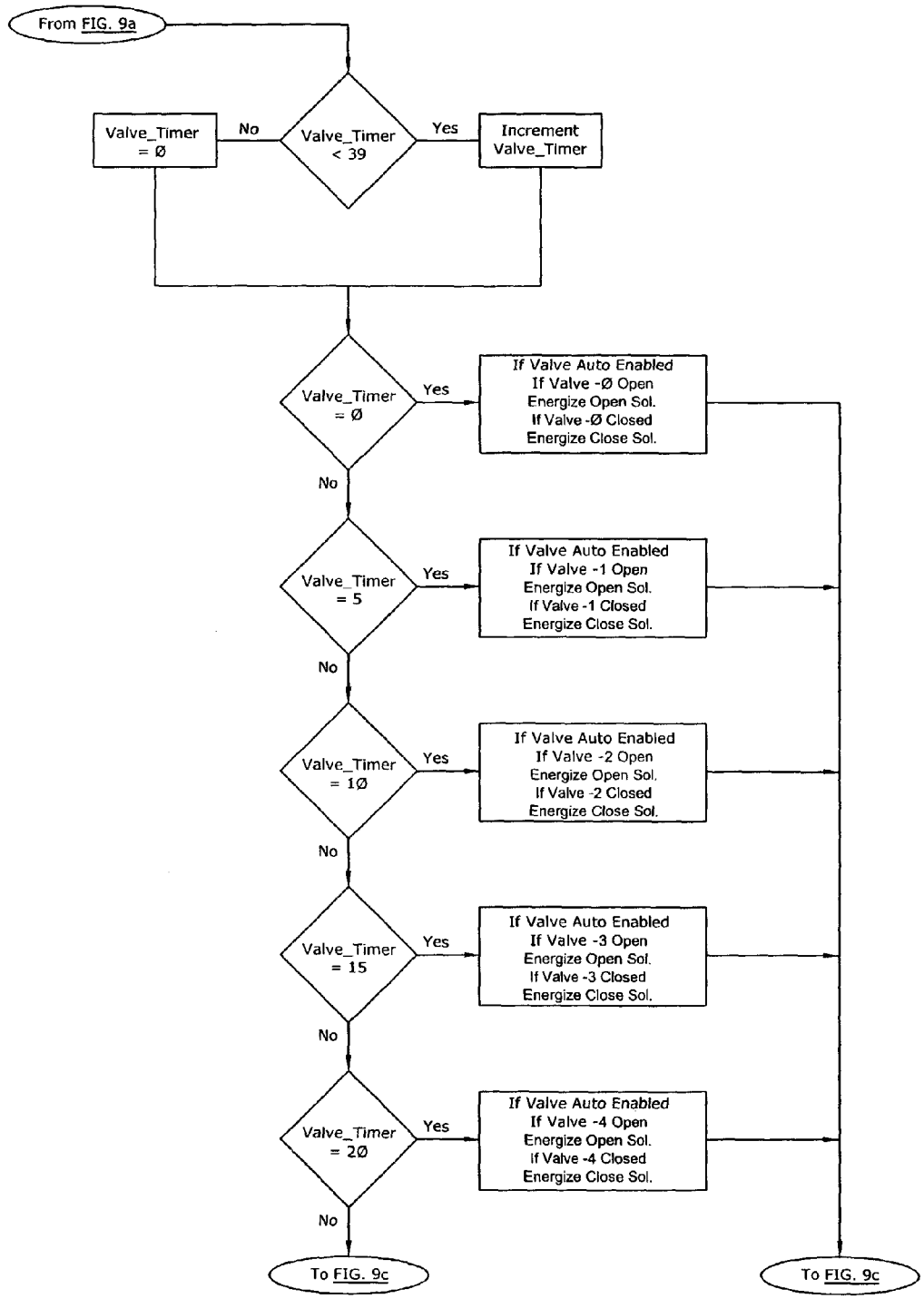
FIG. 9b is a flowchart continuing from FIG. 9a regarding the RVS.
Figure 9C:
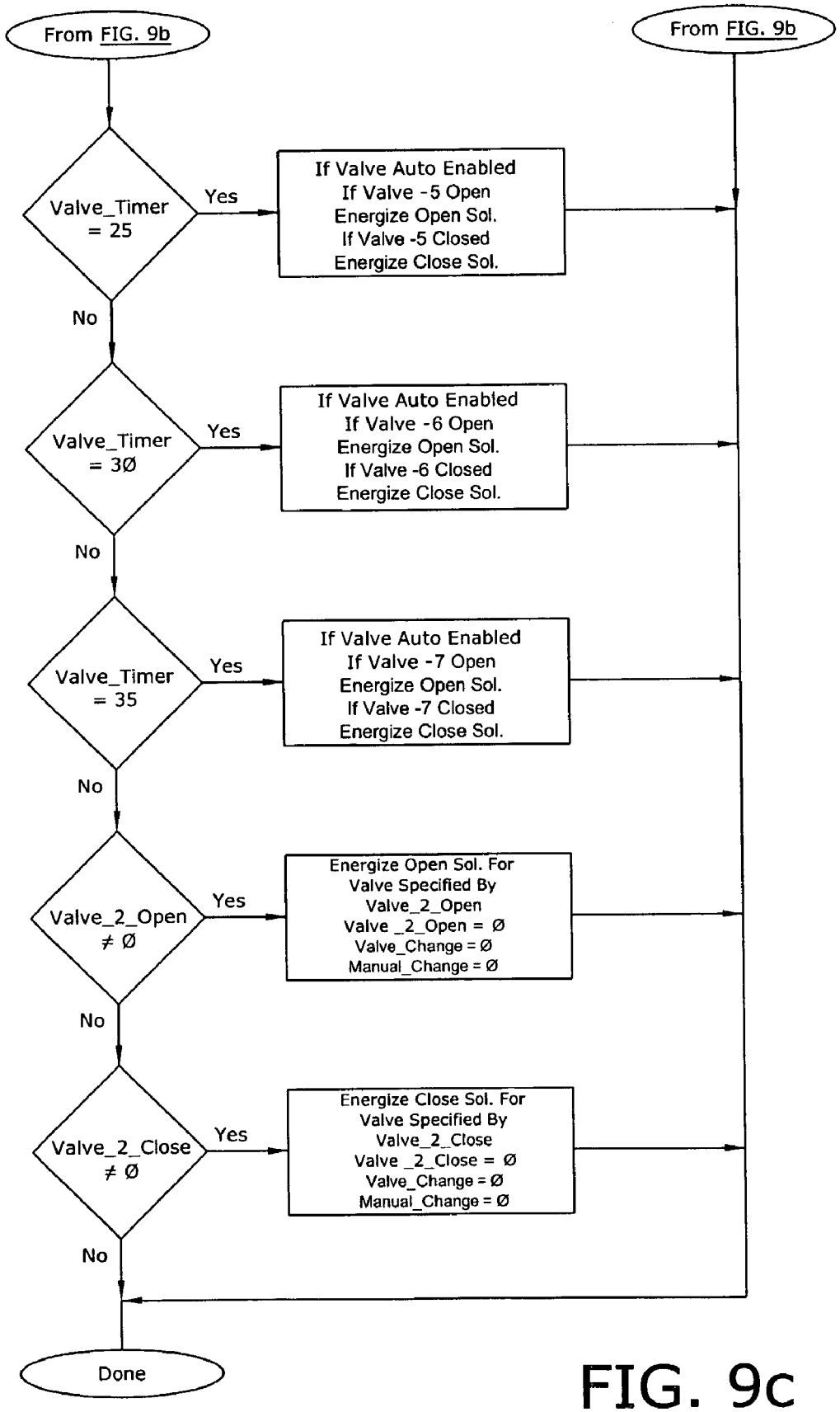
FIG. 9c is a flowchart continuing from FIG. 9b regarding the RVS.

FIGS. 7, 9b and 9c illustrate a routine valve scheduler (RVS) that the present invention follows to periodically energize each of the valves 30-37. The RVS determines which of the valves 30-37 should be energized for a period of time to ensure that the designated valve 30-37 maintains the proper open/closed state that the control unit 40 maintains a record of. The RVS is important since the magnetically latched valves 30-37 may become vibrated or jarred such that the desired state is lost. The RVS is not important if the valves 30-37 are capable of continuously communicating their respective open/closed states to the control unit 40.

As shown in FIGS. 7, 9b and 9c, the control unit 40 energizes the first valve 30 after a time period E. The control unit 40 energizes the first valve 30 to the last known open/closed state as designated by the control unit 40 based upon the fluid presence and other factors. The control unit 40 then energizes the second valve 31 after the time period E to the last known open/closed state as designated by the control unit 40 based upon the fluid presence and other factors. This process continues until all of the valves 30-37 have been energized to their desired open/closed state. After all of the valves 30-37 have been energized, the control unit 40 then starts over with the first valve 30 thereby continuously repeating the RVS to ensure that all of the valves are in the proper open/closed state. If one of the valves 30-37 is in a closed state and senses fluid, this valve can take priority over the other valves and thereby be opened immediately instead of waiting for the RVS to select it for consideration.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

ENVIRONMENTAL ELEMENTS

10. Spray Chamber Valve Control System
20. Spray Chamber
22. Spray Units
30. First Valve
31. Second Valve
32. Third Valve
33. Fourth Valve
34. Fifth Valve
35. Sixth Valve
36. Seventh Valve
37. Eighth Valve
40. Control Unit
50. First Pump
52. Second Pump
60. Fluid Sensor
62. Actuator

We claim:

1. A method of operating a plurality of valves in a spray chamber, said method comprising the steps of:
    determining fluid presence at one or more of said valves;
    opening one or more of said valves that have fluid present;
    activating a pump fluidly connected to said valves; and
    determining if a state change is required of any of said valves and executing said state changes if at least two valves are open;
    executing a one valve open recovery routine when if a state change is required to open a second valve and only a first valve is currently open, wherein said one valve open recovery routine is comprised of the following steps:
    deactivating said pump;
    opening said second valve after a delay time; and
    reactivating said pump.

2. The method of operating a plurality of valves in a spray chamber of claim 1, including the step of performing a routine valve scheduler routine upon said valves for maintaining said valves in their respective desired state.

3. The method of operating a plurality of valves in a spray chamber of claim 1, wherein said routine valve scheduler routine is comprised of the steps of:
    (a) energizing a first valve to an appropriate state; and
    (b) repeating step (a) for a next valve.

4. The method of operating a plurality of valves in a spray chamber of claim 1, wherein said routine valve scheduler routine is comprised of the steps of:
    (a) energizing a first valve to an appropriate state; and
    (b) repeating step (a) for a next valve after a time period.

5. A method of operating a plurality of valves in a spray chamber, said method comprising the steps of:
    providing a spray chamber having a plurality of valves, a spray unit, a pump fluidly connected to said spray unit providing a pressurized fluid and a heat producing device;
    spraying said heat producing device with said pressurized fluid dispensed from said spray unit;
    determining fluid presence at one or more of said valves;
    opening one or more of said valves that have fluid present; and
    determining if a state change is required of any of said valves and executing said state changes if at least two valves are open.

6. The method of operating a plurality of valves in a spray chamber of claim 5, including the step of executing a one valve open recovery routine when if a state change is required to open a second valve and only a first valve is currently open.

7. The method of operating a plurality of valves in a spray chamber of claim 6, wherein said one valve open recovery routine is comprised of the following steps:
   deactivating said pump;
   opening said second valve after a delay time; and
   reactivating said pump.

8. The method of operating a plurality of valves in a spray chamber of claim 5, including the step of performing a routine valve scheduler routine upon said valves for maintaining said valves in their respective desired state.

9. The method of operating a plurality of valves in a spray chamber of claim 8, wherein said routine valve scheduler routine is comprised of the steps of:
   (a) energizing a first valve to an appropriate state; and
   (b) repeating step (a) for a next valve.

10. The method of operating a plurality of valves in a spray chamber of claim 8, wherein said routine valve scheduler routine is comprised of the steps of:
   (a) energizing a first valve to an appropriate state; and
   (b) repeating step (a) for a next valve after a time period.

* * * * *